UNITED STATES PATENT OFFICE.

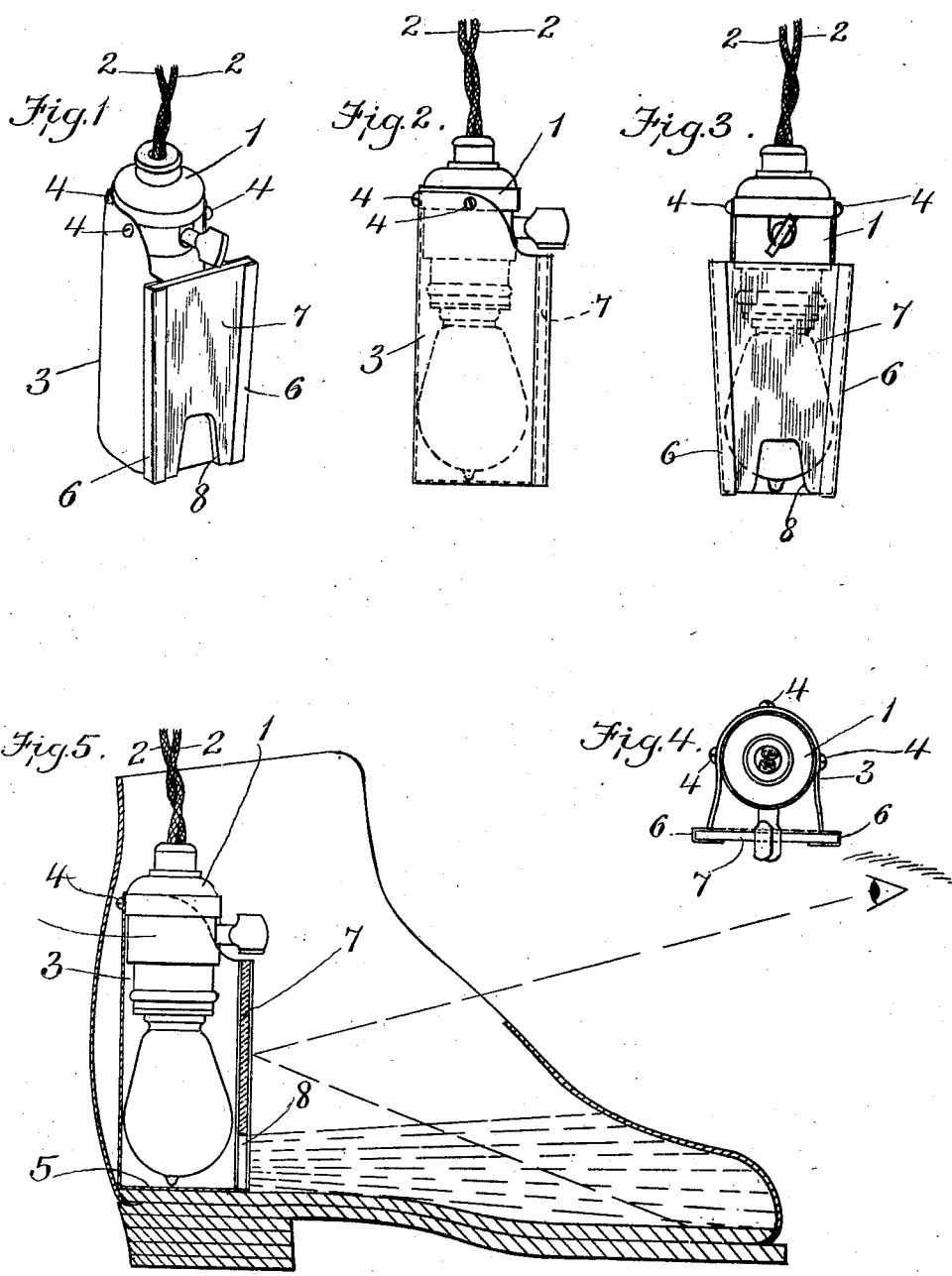

CASSIUS M. THOMPSON, OF STONEHAM, MASSACHUSETTS, ASSIGNOR, BY MESNE ASSIGNMENTS, TO CLIFFORD P. WARREN, TRUSTEE, OF BOSTON, MASSACHUSETTS.

SHOEMAKER'S LIGHT.

991,391.      Specification of Letters Patent.    Patented May 2, 1911.

Application filed December 12, 1907. Serial No. 406,157.

*To all whom it may concern:*

Be it known that I, CASSIUS M. THOMPSON, of Stoneham, in the county of Middlesex and State of Massachusetts, have invented certain new and useful Improvements in Shoemakers' Lights, of which the following is a specification.

This invention relates to a new and improved shoe-maker's light, and consists in the provision of an apparatus wherein a mirror is arranged directly over the point through which the rays from the lamp are permitted to emerge from the apparatus.

Figure 1 is a perspective view of a shoemaker's light, constructed in accordance with my invention, showing the lamp shield, lamp, and the mirror. Fig. 2 is a side elevation of said apparatus, showing the relative arrangement of the lamp shield, lamp, and mirror. Fig. 3 is a front elevation of said apparatus, showing in particular the relative arrangement of the lamp and mirror and the space through which light rays can escape beyond and in front of the mirror. Fig. 4 is a top plan view of said apparatus, showing in particular the clips or ways on the edges of the open side of the light shield for holding the mirror. Fig. 5 is a vertical, sectional view of a shoe with my shoe-maker's light positioned therein, showing the action of the lamp in lighting the inside of the shoe and its sole, and the use of said apparatus to look at the upper surface of the shoe sole, or other part of the lighted inside surface of the shoe.

The same letters of reference indicate the same parts in all of the figures.

1 represents a lamp, here shown as a conventional electric lamp connected to wires 2, 2, in the usual way. Any other form of light may be employed.

3 represents a lamp shield in which the lamp 1, is inserted. In the form shown the upper end of the shield is connected to the lamp by screws 4. This shield may be provided, and in the form shown is provided with a bottom 5. The front of the shield is open and the edges of the walls are bent upon themselves, as shown, to form holders 6, 6, for the edges of the mirror 7, whereby the latter is connected to and held by said shield. As shown, the mirror 7 is wedge shaped in plan view, and the holders 6, 6, are correspondingly inclined to permit the ready insertion and removal of the mirror from the said holders. The reflecting surface of the mirror is upon the outside of the apparatus, as shown in Fig. 5. The lower edge of the mirror is cut away, as at 8, to permit the rays of light from the lamp 1, to emerge at this point, the balance of the mirror forming, in effect, so far as the back side of the mirror is concerned, a part of the shield, serving to intercept the lamp rays. A part of the inside surface of the shield, back of the lamp 1, may be polished, if desired, to serve as a reflector.

The apparatus may be secured to the wall as a bracket light, or hung by wires 2, 2, or if storage battery, or other form of light be employed, the apparatus may be handled and laid about like any other tool.

While the mirror 7 serves to protect the eyes from the direct rays of the lamp 1, at the same time, said mirror serves to reflect the surface lighted by such of said rays as escape through the opening 8. It is obvious, therefore, that the mirror in the form shown, has two distinct functions, one to intercept the light rays, the other to reflect the lighted surface of the shoe, and if desired, the shield 3, might be omitted, the mirror being secured to the lamp in the position shown, in any desired way, serving as the light intercepting, and also as the reflecting means of the apparatus. It is manifest that such results may be secured by different mechanical or functional equivalent constructions in ways well understood by those skilled in the art.

In use the apparatus is placed in the heel of a boot or shoe, the direct rays from the lamp being cut off, except at the opening 8, through which the rays of the lamp 1 pass, as shown in Fig. 5, upon the inside surface of the shoe, including the upper, as well as the sole, thereby permitting the operator to inspect the inside of the shoe and determine by seeing, as distinguished from feeling with the fingers, the presence and precise location of nails, if any, in the bottom of the shoe, or other defects.

For the particular purpose for which this device is intended, it is desirable of course that during an examination of the interior of the shoe there shall be no wavering of the light or of the angle of reflection in the mirror; that while the shoe may be moved or shifted, the lighting and reflection device may be held to move with it, and not loose in the shoe. The eyes of the inspector coud not practically follow a wavering or shifting reflection of the part to be inspected. Therefore the device, although easily insertible and removable, must, to be practical, have some means whereby it can be held by the operator or inspector in such a fixed position relatively to the shoe that the portion to be examined by reflection in the mirror will be stationary to the eye of the inspector so long as the shoe is in stationary position, and so that when the shoe is turned to see more to one side the lamp and its mirror will turn with the shoe. In the construction illustrated, this advantage is obtained by having the back of the casing or shield 3 shaped to snugly fit or bear against the inner heel surfaces of the shoe so that said shield may be placed on one end in such position that one or two fingers of the inspector may so bear on the device as to hold it firmly in the heel portion of the shoe and cause the rays of light and the reflected rays to remain steady during inspection.

Having thus explained the nature of my invention and described a way of constructing and using the same, though without attempting to set forth all of the forms in which it may be made, or all of the modes of its use, what I claim and desire to secure by Letters Patent is:—

A shoe-maker's light comprising a casing adapted to be inserted in the heel of a boot or shoe, a source of light mounted in said casing, and a mirror carried by said casing in front of said light, the parts being arranged to permit the light rays to pass below the mirror at a single point and to a point in front of the same, said mirror and casing preventing the passage of light rays at all other points.

In testimony whereof I have affixed my signature, in presence of two witnesses.

CASSIUS M. THOMPSON.

Witnesses:
J. R. FOWLE,
STANLEY KING.

Copies of this patent may be obtained for five cents each, by addressing the "Commissioner of Patents, Washington, D. C."